(12) United States Patent
Kaneta et al.

(10) Patent No.: US 7,028,716 B2
(45) Date of Patent: Apr. 18, 2006

(54) METHOD FOR REHABILITATING AN EXISTING PIPE

(75) Inventors: Koji Kaneta, Hiratsuka (JP); Takao Kamiyama, Hiratsuka (JP); Kenji Fujii, Hiratsuka (JP); Takeshi Hasegawa, Hiratsuka (JP)

(73) Assignee: Shonan Gosei-Jushi Seisakusho K.K., Kanagawa-ken (JP)

( * ) Notice: Subject to any disclaimer, the term of this patent is extended or adjusted under 35 U.S.C. 154(b) by 0 days.

(21) Appl. No.: 11/109,036

(22) Filed: Apr. 19, 2005

(65) Prior Publication Data

US 2005/0241713 A1    Nov. 3, 2005

(30) Foreign Application Priority Data

Apr. 28, 2004  (JP)  ............... 2004-158541

(51) Int. Cl.
*F16L 55/16* (2006.01)
(52) U.S. Cl. .................. 138/98; 138/97; 405/150.1; 405/184.2; 264/269; 156/287
(58) Field of Classification Search ............. 138/98, 138/97; 405/150.1, 184.2, 152; 264/269, 264/267; 156/287, 94, 95
See application file for complete search history.

(56) References Cited

U.S. PATENT DOCUMENTS

| | | | |
|---|---|---|---|
| 4,648,454 A * | 3/1987 | Yarnell ................ 166/297 |
| 5,108,533 A * | 4/1992 | Long et al. ............ 156/294 |
| 5,340,160 A * | 8/1994 | Meijers et al. .......... 285/15 |
| 5,451,284 A * | 9/1995 | Ikeda et al. ............ 156/247 |
| 5,915,419 A * | 6/1999 | Tweedie et al. ......... 138/98 |
| 5,944,058 A * | 8/1999 | Kamiyama et al. ...... 138/98 |
| 5,950,682 A * | 9/1999 | Kiest, Jr. ............... 138/98 |
| 5,967,192 A * | 10/1999 | Lewin .................... 138/98 |
| 5,971,032 A * | 10/1999 | Ward ..................... 138/98 |
| 6,044,867 A * | 4/2000 | Tweedie et al. ......... 138/98 |
| 6,056,017 A * | 5/2000 | Kamiyama et al. ...... 138/98 |
| 6,068,725 A * | 5/2000 | Tweedie et al. ........ 156/287 |
| 6,082,411 A * | 7/2000 | Ward ..................... 138/98 |
| 6,103,052 A * | 8/2000 | Kamiyama et al. ..... 156/253 |
| 6,123,109 A * | 9/2000 | Kamiyama et al. ...... 138/98 |
| 6,540,438 B1 * | 4/2003 | De Bruijn et al. ..... 405/150.1 |
| 6,540,439 B1 * | 4/2003 | De Bruijn et al. ..... 405/150.1 |
| 6,581,334 B1 * | 6/2003 | Oney et al. ............ 52/2.18 |
| 6,688,337 B1 * | 2/2004 | Ward ..................... 138/98 |
| 2003/0106601 A1 * | 6/2003 | Kweon .................... 138/98 |

* cited by examiner

Primary Examiner—Patrick Brinson
(74) Attorney, Agent, or Firm—Adams & Wilks

(57) ABSTRACT

A rehabilitating pipe having a flange at one end thereof is laid inside a first existing pipe so that the flange contacts an inner circumferential surface portion of a second existing pipe surrounding a portion where the first and second existing pipes intersect. A flange part of a flanged tubular member is adhesively fixed to the inner circumferential surface of the second existing pipe so that the flange part covers the flange of the rehabilitating pipe and the inner circumferential surface portion of the second existing pipe. A tubular part of the flanged tubular member is adhered to the rehabilitating pipe to thereby seal a gap between an inner circumference of the first existing pipe and an outer circumference of the rehabilitating pipe.

15 Claims, 6 Drawing Sheets

METHOD FOR REHABILITATING AN EXISTING PIPE

BACKGROUND OF THE INVENTION

1. Field of the Invention

The present invention relates to an existing pipe rehabilitation construction method that rehabilitates an existing pipe, such as a sewer pipe, by laying a rehabilitating pipe inside the existing pipe.

2. Description of the Prior Art

As an example of a conventional existing pipe rehabilitation construction method, a method is described in Japanese Examined Patent Application No. 55-43890 wherein a lining material comprising a tubular (bag shaped) flexible resin absorber impregnated with a liquid setting resin is supplied in a strip shaped, folded configuration. The lining material is then inserted inside the existing pipe and pressed against an inner circumferential surface of the existing pipe by the pressure of a fluid, such as water, so that it takes a tubular shape that is the same shape as the inner circumferential surface of the existing pipe. The setting resin is then hardened to provide a rehabilitating pipe for the existing pipe. Furthermore, if the diameter of the existing pipe is large, then a gap is created between the outer circumference of the rehabilitating pipe and the inner circumference of the existing pipe due to shrinkage when hardening the lining material; therefore, by filling that gap with filler and hardening the filler, the rehabilitating pipe, the filler, and the existing pipe are integrated as a compound pipe, thereby improving strength. Furthermore, there are also cases where, to improve strength, a gap of a prescribed dimension is secured in advance by preinstalling spacers on the inner circumferential surface of the existing pipe, and the gap is then filled with filler.

In addition, Japanese Laid Open Patent Application No. 2003-286742 describes a rehabilitation construction method wherein: a rehabilitating pipe is assembled and laid in the pipe longitudinal direction using segments. One segment is equivalent to a block obtained by partitioning a small rehabilitating pipe in the circumferential direction and the pipe longitudinal direction. The segments are coupled in the circumferential direction and the pipe longitudinal direction; and the gap between the outer circumference of that rehabilitating pipe and the inner circumference of the existing pipe is filled with a filler, which is then hardened, thereby integrating the rehabilitating pipe, the filler, and the existing pipe as a compound pipe.

Rehabilitating pipes comprising the above discussed lining material or segments are often laid so long as to extend from the opening of the portion that intersects with a manhole to the opening of the portion that intersects with the next manhole. After laying a rehabilitating pipe in that manner, it is necessary to prevent the leakage of filler by, prior to filling with the filler, sealing the gap (opening) between the outer circumference of the rehabilitating pipe and the inner circumference of the existing pipe. This sealing is also required to prevent infiltration of external ground water. In addition, if, for example, the rehabilitating pipe is laid such that it intersects a branch pipe, it is necessary to form a hole in the rehabilitating pipe that communicates with the branch pipe. Even in this case, it is necessary to prevent the leakage of filler and the infiltration of ground water by sealing the gap between the outer circumference of the rehabilitating pipe and the inner circumference of the existing pipe.

These gap openings have conventionally been sealed by plugging the gap opening with a sealing material comprising resin putty, mortar, and the like. Particularly in the case where the diameter of the existing pipe and the diameter of the rehabilitating pipe are large and the gap is therefore large, there is nevertheless a problem with this method in that it is difficult to perfectly seal the opening by completely plugging the entirety of the gap opening.

It is therefore an object of the present invention to provide an existing pipe rehabilitation method that, during the construction work of rehabilitating intersecting existing pipes, can perfectly seal the gap between the inner circumference of the existing pipe and the outer circumference of the rehabilitating pipe.

SUMMARY OF THE INVENTION

According to the invention, a method for rehabilitating an existing pipe in which a rehabilitating pipe is laid inside a first existing pipe that intersects with a second existing pipe, comprises the steps of laying a rehabilitating pipe inside the first existing pipe; preparing a flanged tubular member having a tubular part and a flange part on one end thereof; adhesively fixing the flange part of the flanged tubular member to an inner circumferential surface of the second existing pipe; and inserting the tubular part of the flanged tubular member into the rehabilitating pipe of the first exiting pipe for adhesion thereto, thereby sealing the gap between the inner circumference of the first existing pipe and the outer circumference of the rehabilitating pipe thereof.

Furthermore, according to the invention, a method for rehabilitating an existing pipe in which a rehabilitating pipe is laid inside a first existing pipe that intersects with a second existing pipe, comprises the steps of laying a rehabilitating pipe inside the first existing pipe so long as to cross over the second existing pipe; forming a hole in the rehabilitating pipe of the first existing pipe at a position at which it intersects with the second existing pipe; preparing a flanged tubular member having a tubular part and a flange part on one end thereof; adhesively fixing the flange part of the flanged tubular member to an inner circumferential surface of the rehabilitating pipe of the first existing pipe; and inserting the tubular part of the flanged tubular member through the hole into the second exiting pipe for adhesion thereto, thereby sealing the gap between the inner circumference of the first existing pipe and the outer circumference of the rehabilitating pipe thereof.

In the invention, the flanged tubular member can perfectly seal the gap between the inner circumference of the existing pipe and the outer circumference of the rehabilitating pipe thereof, thereby reliably preventing the leakage of filler and the infiltration of ground water.

Further features of the invention, its nature and various advantages will be more apparent from the accompanying drawings and following detailed description of the invention.

DETAILED DESCRIPTION OF THE PREFERRED EMBODIMENTS

The present invention will be described based on preferred embodiments, referring to the attached drawings.

In the following embodiments the rehabilitation construction work is sequentially performed in the order of the branch pipe, the main pipe, and the manhole in a sewage piping facility; however, the rehabilitation construction work is actually performed as needed based on the state of the breakage of the respective pipes, and it is understood that the construction sequence is not limited thereto, nor are all three construction works necessarily performed.

Figure 1:
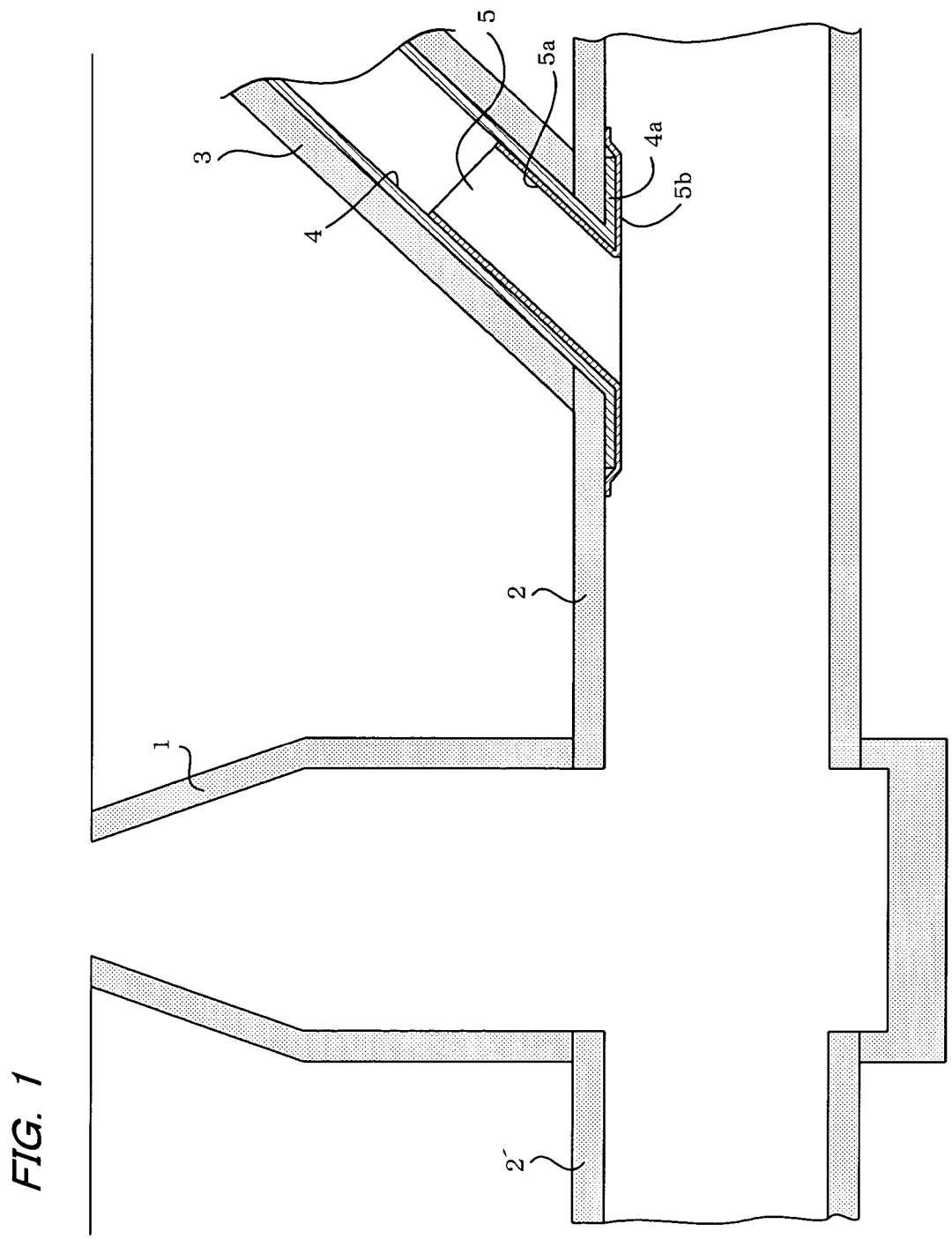
FIG. 1 is a cross-sectional view that depicts the state wherein the branch pipe rehabilitation has been performed in the existing pipe rehabilitation construction work of the embodiment of the present invention.
Figure 2:
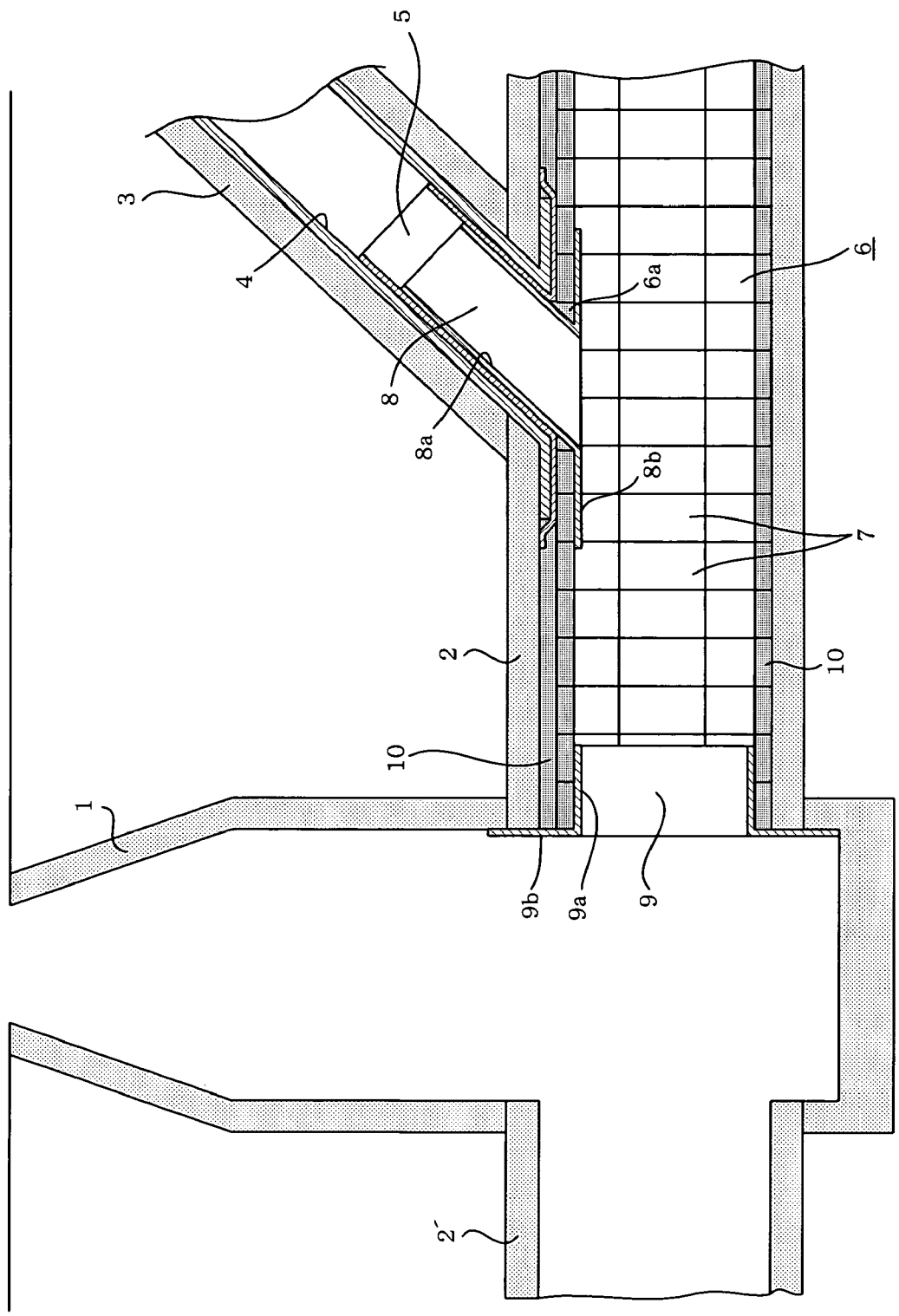
FIG. 2 is a cross-sectional view that depicts the state wherein rehabilitation construction work has been further performed on the main pipe that intersects with the branch pipe.
Figure 3:
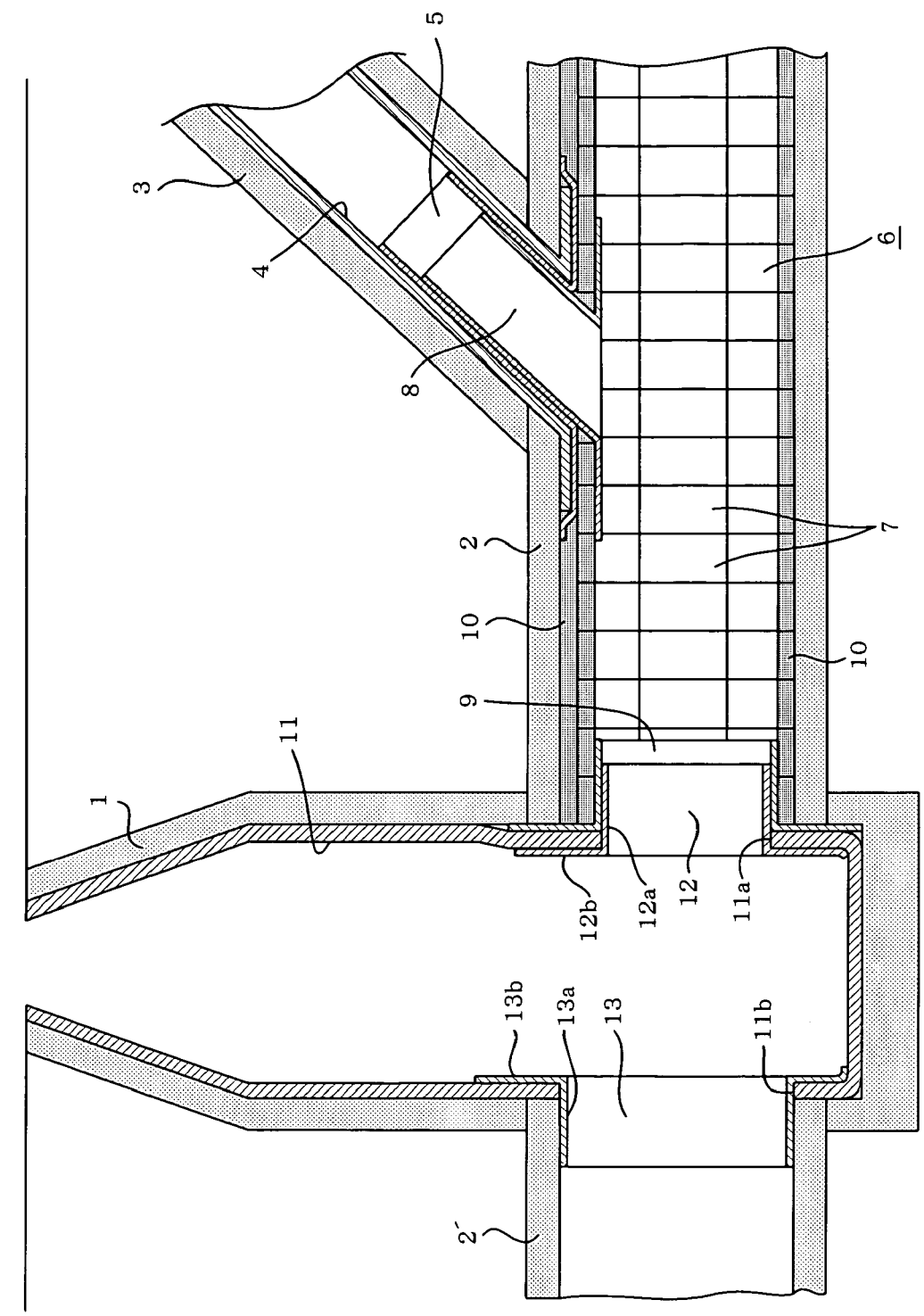
FIG. 3 is a cross-sectional view that depicts the state wherein rehabilitation construction work has been further performed on a manhole that intersects with the main pipe.

In an embodiment of the present invention, as shown in FIG. 1 through FIG. 3, an existing piping facility comprises a lateral service pipe or manhole 1 disposed vertically, main pipes 2, 2' that substantially intersect horizontally therewith, and a branch pipe 3 that diagonally intersects with the main pipe 2, and the rehabilitation construction work is sequentially performed in the order of the branch pipe 3, the main pipe 2, and the manhole 1. Furthermore, the manhole 1, the main pipes 2, 2' and the branch pipe 3, herein, are all circular pipes.

First, as shown in FIG. 1, a rehabilitating pipe is laid by a branch pipe lining material 4 that lines an inner circumferential surface of the branch pipe 3. The branch pipe lining material 4 is made of a flexible, thick, sheet-shaped resin absorber (comprising a nonwoven fabric made of polyester fibers, and the like) impregnated with a liquid setting resin, such as an unsaturated polyester resin, a vinyl ester resin, or an epoxy resin; is tubularly (bag-shaped) formed so that its outer diameter corresponds to the inner diameter of the branch pipe 3; and is supplied to the rehabilitation construction site in a strip-shaped, folded configuration with the liquid setting resin in an uncured state. Although not illustrated in detail, a plastic film, such as polyethylene, is affixed to the surface of the branch pipe lining material 4. In addition, in a base end part, a flange part 4a is formed whose shape is substantially the same as a flange part 5b of a flanged tubular member 5 in FIG. 4. The flange part 4a is circularly or elliptically shaped, curved at a curvature corresponding to the inner circumferential surface of the main pipe 2, and disposed at the base end part of the branch pipe lining material 4 at an angular inclination corresponding to the angle of intersection of the main pipe 2 and the branch pipe 3. In addition, unlike other portions of the branch pipe lining material 4, the flange part 4a is formed as a hardened object with the impregnated liquid setting resin pre-cured.

In the rehabilitation construction work of the branch pipe 3, an apparatus (not illustrated) first presses the flange part 4a of the branch pipe lining material 4 against the inner circumferential surface of the main pipe 2 that surrounds the opening of the portion where the branch pipe 3 and the main pipe 2 intersect, and air pressure or water pressure is applied to turn the tubular portion of the branch pipe lining material 4 inside out while inserting it into the branch pipe 3. Furthermore, by, for example, precoating the upper surface with an adhesive, the flange part 4a adheres to the inner circumferential surface of the main pipe 2. When the eversion and insertion of the required length is completed, the liquid setting resin of the branch pipe lining material 4 is cured by heating with a warm water showering in a state wherein the inserted branch pipe lining material 4 is pressed against the inner circumferential surface of the branch pipe 3 by air pressure, and the branch pipe lining material 4 is thereby hardened as a rehabilitating pipe.

In so doing, the rehabilitating pipe comprising the branch pipe lining material 4 is laid in the pipe longitudinal direction of the branch pipe 3. Here, the flange part 4a seals the gap between the inner circumference of the branch pipe 3 and outer circumference of the branch pipe lining material 4 at the circumferential edge part of the opening of the branch pipe 3 at the portion where it intersects with the main pipe 2, although the seal is not necessarily perfect. In addition, it is necessary to protect the flange part 4a when performing the work of forming a hole 6a in a rehabilitating pipe 6 of FIG. 2, which is discussed later. Consequently, the flanged tubular member 5 is fixed to the opening of the branch pipe 3, as shown in FIG. 1.

Figure 4:
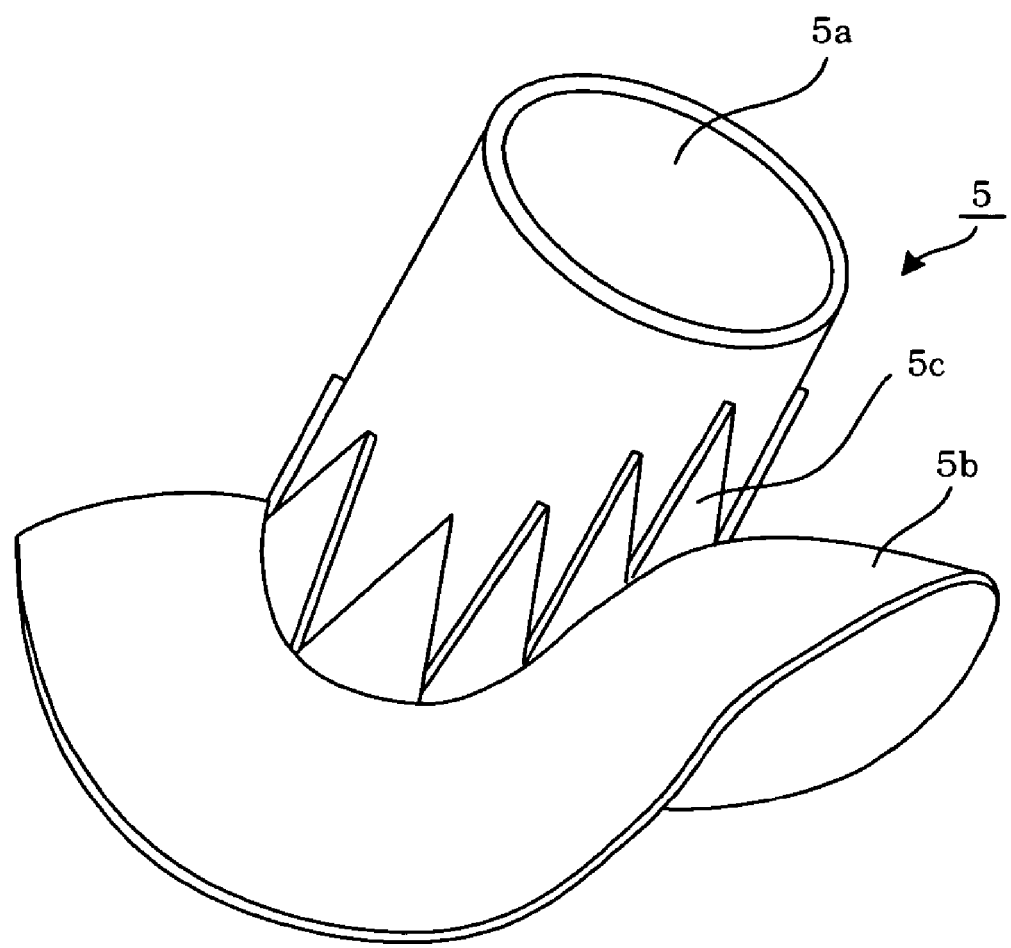
FIG. 4 is a perspective view that depicts the exterior of the flanged tubular member shown in FIG. 1.

The flanged tubular member 5 comprises a flexible, sheet-shaped resin absorber that is impregnated with a liquid setting resin, the same as the branch pipe lining material 4, and has a structure, for example, as shown in FIG. 4. A shape having the circular or elliptical flange part 5b curved with a curvature corresponding to the inner circumferential surface of the main pipe 2 is formed on one end of a cylindrical tubular part 5a whose outer diameter corresponds to the inner diameter of the branch pipe lining material 4, and a plastic film (not illustrated) is affixed to the inner circumferential surface of the tubular part 5a and the lower surface of the flange part 5b. The tubular part 5a is inclined with respect to the flange part 5b at an angle corresponding to the angle of intersection of the branch pipe 3 with respect to the main pipe 2. The diameter of the flange part 5b is greater than the outer diameter of the branch pipe 3 and the diameter of the flange part 4a of the branch pipe lining material 4. Furthermore, the liquid setting resin, the resin absorber, and the plastic film that constitute the flanged tubular member 5 are the same as those used in the branch pipe lining material 4.

Although it is acceptable to use for the flanged tubular member 5 one that is manufactured as a hardened object by preforming the resin absorber at a factory into a shape corresponding to the flanged tubular member 5, impregnating the resin absorber with a liquid setting resin, and hardening the liquid setting resin, it is preferable to manufacture the flanged tubular member 5 at the rehabilitation construction site as a structure of a type shown in FIG. 4, for example. This is so that the shape of the tubular part 5a and the shape of the flange part 5b respectively accurately match the inner circumferential surface of the branch pipe lining material 4 to be bonded to and the shape to which it will tightly contact the lower surface of the flange part 4a and the inner circumferential surface of the main pipe 2 surrounding the same. Thus, the angle of the tubular part 5a with respect to the flange part 5b accurately matches the angle at which the branch pipe lining material 4 intersects the main pipe 2, and the shape of the outer circumferential surface of the tubular part 5a and the shape of the upper surface of the flange part 5b are respectively formed into shapes corresponding to the shapes of the surfaces to which they will bond. Furthermore, it is presupposed in on-site manufacturing that the diameter of the main pipe 2 is large enough to allow a worker to perform the following procedure inside the main pipe 2.

If manufacturing is performed on-site, then the resin absorber tubularly formed for the tubular part 5*a* (hereinafter, referred to as the tubular part absorber), and the resin absorber for the flange part 5*b* circularly or elliptically formed and whose external form corresponds to the flange part 5*b* planarly unfolded (hereinafter, referred to as the flange part absorber), are prepared in advance. First, the tubular part absorber is inserted for just an appropriate length into the branch pipe lining material (rehabilitating pipe) 4 in the opening of the portion where the branch pipe 3 and the main pipe 2 intersect; the outer circumferential surface of the tubular part absorber is marked with a line having a shape of the edge of the opening of the portion where the branch pipe lining material 4 and the main pipe 2 intersect, i.e., the opening of a flange part 4*a*; the tubular part absorber is then taken out and cut along the marked line; and the shape of the lower end of the tubular part absorber is thereby formed into the shape of the edge of the opening of the flange part 4*a*.

Next, the flange part absorber is pressed against the lower surface of the flange part 4*a* so that a center part of the flange part absorber opposes the opening of the flange part 4*a*; the flange part absorber is marked with a line in the shape of the edge of the opening of the flange part 4*a*; after which the area inside the marked line at the center part of the flange part absorber is radially cut; and a plurality of substantially triangular cut pieces 5*c* shown in FIG. 4 is thus formed (note that it is also acceptable to perform at the factory the steps from these cuts to the impregnation of the liquid setting resin).

Next, the flange part absorber is impregnated with the liquid setting resin and the flange part 5*b* is left in an unhardened state, after which the cut area of the center part of the flange part 5*b* is aligned with the opening of the flange part 4*a*; air pressure and the like from an apparatus (not illustrated) is used to bring the portion outside of the center part of the flange part 5*b* into pressure contact with the lower surface of the flange part 4*a* and the inner circumferential surface of the main pipe 2 surrounding the same; the center part of each cut piece 5*c* is bent upward and brought into pressure contact with the inner circumferential surface of the branch pipe lining material 4; the liquid setting resin is heated with a warm water shower and the like to cure the liquid setting resin; and the entire flange part 5*b* is thereby cured. Because of the liquid setting resin that hardens, the main body of the flange part 5*b* outside of the cut pieces 5*c* bonds to the lower surface of the flange part 4*a* and to the inner circumferential surface of the main pipe 2 surrounding the same, and each cut piece 5*c* bonds to the inner circumferential surface of the branch pipe lining material 4. Furthermore, to enhance adhesive strength, it is also acceptable to interpose a thin adhesive sheet impregnated with an adhesive (not illustrated) between the flange part 5*b* and the bonding surface thereof. In addition, after bonding, the plastic film is peeled off each cut piece 5*c*. Furthermore, by bending each cut piece 5*c*, an opening is formed in the center part of the flange part 5*b* corresponding to the opening of the flange part 4*a*.

Next, the tubular part absorber is impregnated with the liquid setting resin with the tubular part 5*a* remaining in the uncured state, after which an apparatus (not illustrated) inserts the tubular part 5*a* from the main pipe 2 into the rehabilitating pipe of the branch pipe lining material 4 inside the opening of the branch pipe 3, the position of the lower end is aligned with the flange part 5*b*, the tubular part 5*a* is brought into pressure contact with the inner circumferential surface of the branch pipe lining material 4 and each cut piece 5*c* of the flange part 5*b* and the liquid setting resin is heated to cure the tubular part 5*a*. Due to the liquid setting resin that hardens, the tubular part 5*a* bonds to the inner circumferential surface of the branch pipe lining material 4, as well as bonds with each cut piece 5*c* and integrally couples with the flange part 5*b*, and a flanged tubular member 5 is thereby manufactured. It is also acceptable at this time to interpose an adhesive sheet (not illustrated).

Furthermore, flanged tubular members 8 and 9 shown in FIG. 2 and flanged tubular members 12 and 13 shown in FIG. 3 are made of a resin absorber the same as the flanged tubular member 5 impregnated with the same liquid setting resin, have the same structure, differ only in the diameter of the tubular part or the size of the flange part, and utilize the same method for manufacturing and fixing at the construction site. The tubular part of the flanged tubular member 8 is inclined with respect to the flange part, the same as with the flanged tubular member 5; however, in the flanged tubular members 9, 12 and 13, a tubular part 9*a* is substantially perpendicular to a flange part 9*b* corresponding to the angle of intersection of the main pipe 2 or 2' and the manhole 1.

As discussed above, after the flanged tubular member 5 is manufactured at the construction site and adhesively fixed to the opening of the branch pipe lining material 4, the rehabilitating pipe 6 comprising segments as shown in FIG. 2 is laid inside the main pipe 2 from the opening of the portion where the main pipe 2 and the manhole 1 intersect, across the portion where the branch pipe 3 intersects, to the opening of the portion where the adjacent manhole (not illustrated) intersects.

Figure 6:
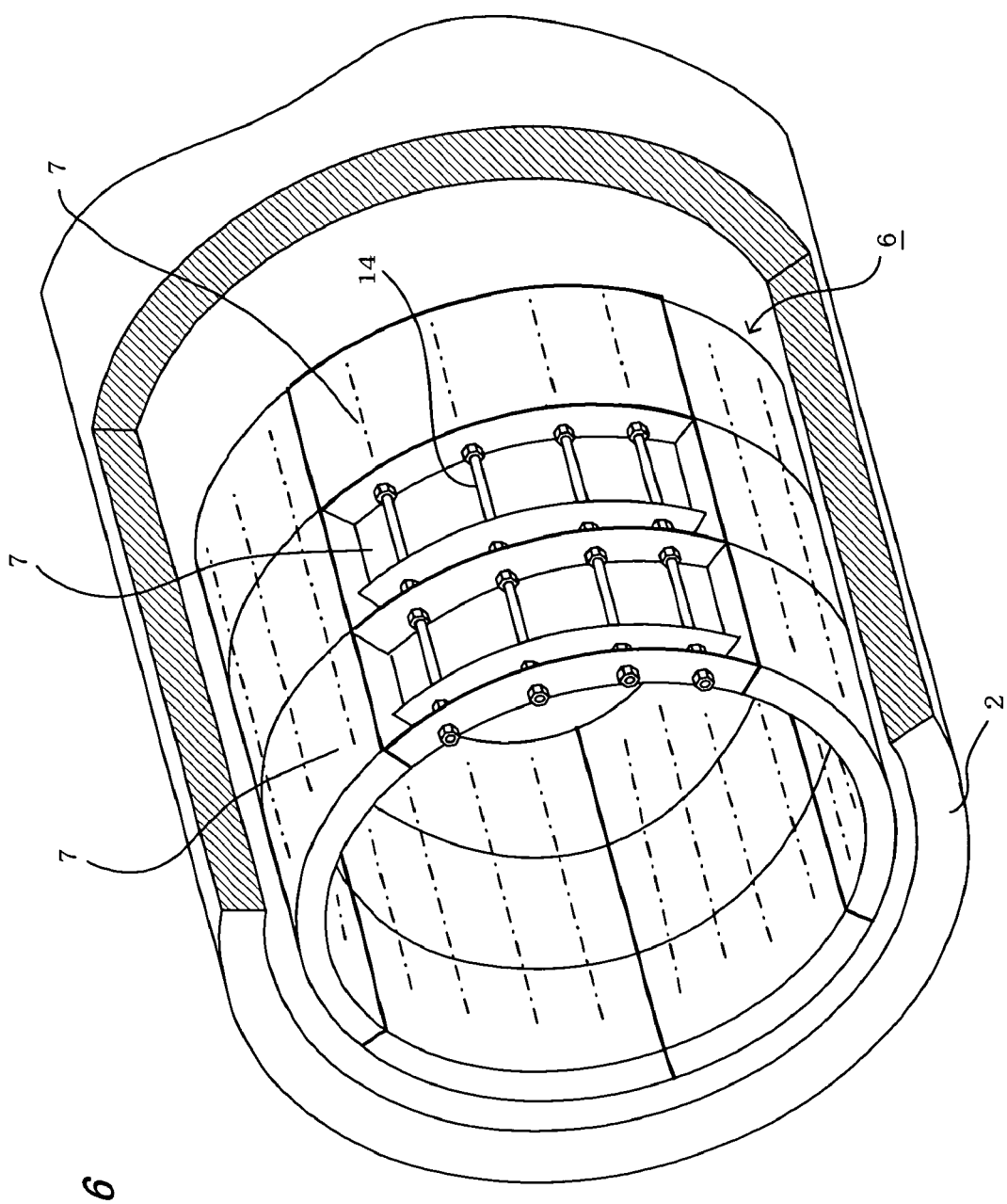
FIG. 6 is a perspective view that schematically depicts an aspect wherein a rehabilitating pipe comprising segments has been laid inside a main pipe.

As schematically shown in FIG. 6, one segment 7 corresponds to a block obtained by sectioning the rehabilitating pipe 6 at a prescribed width in the pipe longitudinal direction thereof, and then further cutting it circumferentially so that the sections are partitioned (preferably in equal parts) at a plurality of locations in the circumferential direction of the rehabilitating pipe 6. Specifically, although not illustrated in detail, the rehabilitating pipe 6 is constituted so that: the plates comprising the inner surface of the inner circumferential surface, the side surfaces on both sides in the pipe longitudinal direction, and the end surfaces on both sides in the circumferential direction are integrally formed with reinforcing plates and made of a transparent plastic (vinyl chloride, ABS, DuraStar polymer (trade name), and the like); it is hollow; and it is open on the outer circumferential side.

Short rings are assembled by coupling a prescribed number of these segments 7 in the circumferential direction by bolts and nuts (not illustrated), and these rings are mutually coupled successively in the pipe longitudinal direction to assemble and lay the rehabilitating pipe 6 in the main pipe 2. The coupling in the pipe longitudinal direction is performed by inserting and latching long, bolt-shaped coupling members 14, each having one end comprising a nut part and the other end comprising a screw part, through all segments 7 in the pipe longitudinal direction, thereby mutually coupling the coupling members 14 by screwing and tightening the nut parts and the screw parts together. Furthermore, the chain lines in FIG. 6 indicate the insertion positions of the coupling members 14. In addition, the rehabilitating pipe 6, whose outer diameter is a prescribed amount less than the inner diameter of the main pipe 2, is positioned so that the lower end of its outer circumference contacts the bottom of the main pipe 2.

After the rehabilitating pipe 6 is laid in this manner, the opening of the portion where the branch pipe 3 and the branch pipe lining material 4 intersect with the main pipe 2 is plugged up by the laid rehabilitating pipe 6, and the hole 6a is therefore formed in the rehabilitating pipe 6 at the region opposing the abovementioned opening. Because all segments 7 of the rehabilitating pipe 6 are transparent, the region where the hole 6a should be formed can be easily verified.

Next, the flanged tubular member 8 is fixed to seal the gap between the inner circumference of the main pipe 2 and the outer circumference of the rehabilitating pipe 6 at the circumferential edge parts of the hole 6a and the abovementioned opening. The flanged tubular member 8 is completely the same as the flanged tubular member 5 except that the outer diameter of a tubular part 8a corresponds to the inner diameter of the tubular part 5a of the flanged tubular member 5; in addition, they are manufactured at the construction site in the same manner. Namely, the resin absorber for the flange part whose center part was radially cut to match the hole 6a is impregnated with the liquid setting resin, a flange part 8b in an unhardened state is formed, the portion on the outside of the center part that was cut in this flange part 8b is brought into pressure contact with the inner circumferential surface of the rehabilitating pipe 6 at the portion surrounding the hole 6a, each of the plurality of cut pieces (not illustrated) formed by cutting the center part is bent upward and brought into pressure contact with the inner circumferential surface of the tubular part of the flanged tubular member 5, and then bonded by heating to harden the liquid setting resin.

Next, the tubular part 8a is formed in the unhardened state by impregnating with liquid setting resin for the tubular part whose lower end part was cut to match the shape of the circumferential edge of the hole 6a; this tubular part 8a is inserted from the opening of the center part of the flange part 8b and from the hole 6a into the tubular part of the flanged tubular member 5; the tubular part 8a is brought into pressure contact with the inner circumferential surface thereof and the bent cut pieces (not illustrated) of the flange part 8b a and bonded thereto by heating and hardening the liquid setting resin. The tubular part 8a is thus integrally coupled to the flange part 8b, thereby manufacturing the flanged tubular member 8.

Furthermore, in a case wherein the rehabilitating pipe of the branch pipe lining material 4 is not to be laid and, naturally, a flanged tubular member 5 is consequently also not to be provided, then it is understood that the tubular part 8a shall have an outer diameter corresponding to the inner diameter of the branch pipe 3, and shall then be inserted inside the opening of the branch pipe 3 and brought into pressure contact and bonded with the inner circumferential surface thereof.

Figure 5:
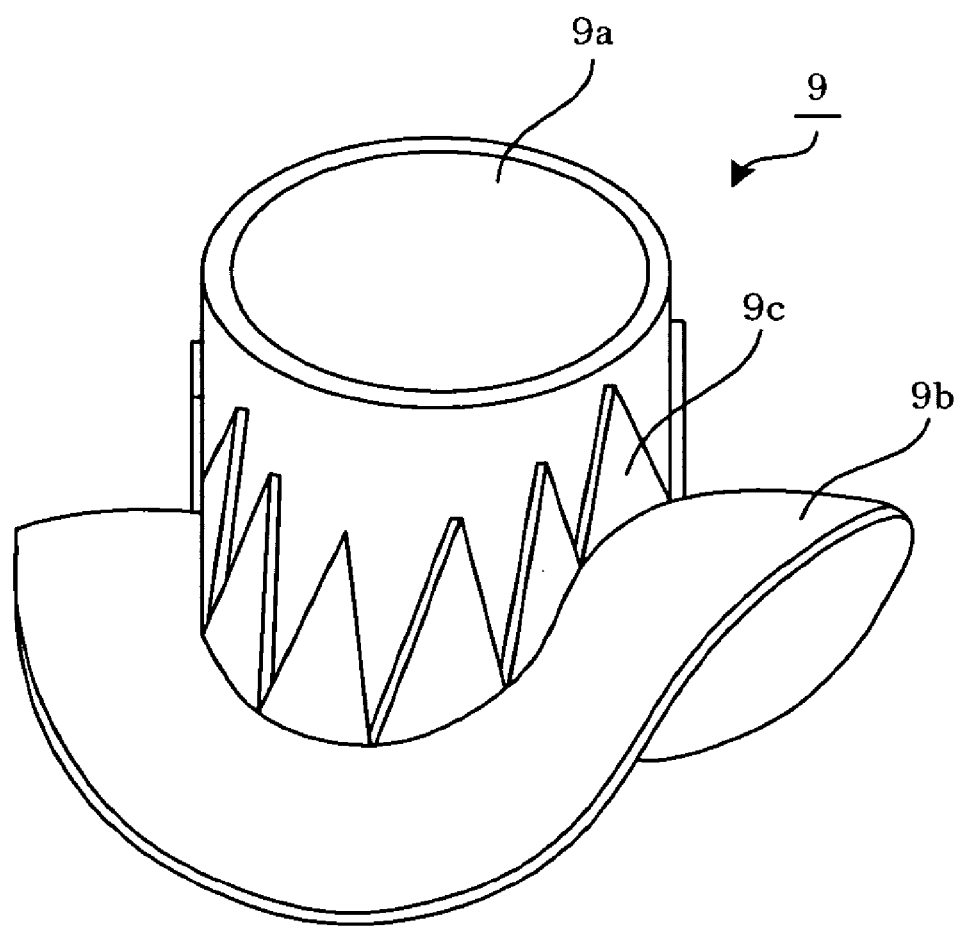
FIG. 5 is a perspective view that depicts the exterior of the flanged tubular member in FIG. 2.

Next, to perform sealing at the circumferential edge parts of the opening of the portion where the main pipe 2 and the rehabilitating pipe 6 intersect with the manhole 1, the flanged tubular member 9 is fixed to the opening thereof. As shown in FIG. 5, the tubular part 9a of the flanged tubular member 9 is substantially perpendicular to the flange part 9b, corresponding to the angle at which the main pipe 2 and the rehabilitating pipe 6 intersect with the manhole 1. The outer diameter of the tubular part 9a corresponds to the inner diameter of the rehabilitating pipe 6, and the diameter of the flange part 9b is greater than the outer diameter of the main pipe 2. Outside of this, the structure, and the manufacturing and fixing methods are the same as for the flanged tubular members 5, 8. By a similar method, the center part formed by cut pieces 9c of the flange part 9b is aligned with the opening of the rehabilitating pipe 6. The portion outside of the center part of the flange part 9b is then brought into pressure contact and bonded with the end surfaces of the main pipe 2 and the rehabilitating pipe 6 and with the inner circumferential surface of the manhole 1 surrounding that opening, and each of the cut pieces 9c of the flange part 9b is brought into pressure contact and bonded with the inner circumferential surface of the rehabilitating pipe 6. The tubular part 9a is then inserted from the opening of the center part of the flange part 9b into the rehabilitating pipe 6 inside the opening of the main pipe 2 and brought into pressure contact and bonded with the inner circumferential surface of the rehabilitating pipe 6 and with each of the cut pieces 9c.

After the flanged tubular member 9 is adhesively fixed in this manner, the gap between the inner circumference of the main pipe 2 and the outer circumference of the rehabilitating pipe 6 is filled with filler 10, and hardened. A resin mortar, having as its main ingredient a cement mortar, an epoxy resin, a polyester resin, or the like, is used for the filler 10.

Next, as shown in FIG. 3, a rehabilitating pipe comprising a manhole lining material 11 that lines the inner circumferential surface of the manhole 1 is laid. The manhole lining material 11 is a bottomed, tubular (bag-shaped), flexible resin absorber corresponding to the shape of the manhole 1 and impregnated with a liquid setting resin, and the liquid setting resin and the material properties of that resin absorber are the same as for the branch pipe lining material 4. In addition, a plastic film (not illustrated) is affixed to the outer surface of the manhole lining material 11.

This manhole lining material 11 is inserted in a folded state from the upper opening into the manhole 1, and inserted until it reaches the bottom of the manhole 1 lower than the portion that intersects with the main pipes 2, 2', after which a tubular (bag-shaped), fluid pressure barrier liner (not illustrated) having a shape corresponding to the manhole 1 is inserted from above inside the manhole lining material 11 by water pressure. Subsequently, in a state wherein the manhole lining material 11 is brought into pressure contact with the inner circumferential surface and the bottom surface of the manhole 1 by air pressure via the fluid pressure barrier liner, the liquid setting resin of the manhole lining material 11 is heated and hardened by a warm water shower, thereby hardening the manhole lining material 11 as a rehabilitating pipe having a shape corresponding to the manhole 1.

After the rehabilitating pipe of the manhole lining material 11 is laid in this manner, holes 11a, 11b are formed in the manhole lining material 11 at the opening of the rehabilitating pipe 6 (opening of the flanged tubular member 9).

Next, the flanged tubular members 12, 13 are respectively fixed to the opening of the rehabilitating pipe 6 and the opening of the main pipe 2'. The flanged tubular members 12, 13 are the same as the flanged tubular member 9 excepting that the outer diameters of the tubular parts 12a, 13a correspond to the inner diameter of the tubular part of the flanged tubular member 9 and the inner diameter of the main pipe 2'.

To fix the flanged tubular member 12, a flange part 12b is first brought into pressure contact and bonded with the inner circumferential surface of the manhole lining material 11 at the portion surrounding the hole 11a, and each cut piece (not illustrated) of the center part of the flange part 12b is bent and brought into pressure contact and bonded with the inner circumferential surface of the tubular part of the flanged tubular member 9. Next, from the hole 11a and the opening of the center part of the flange part 12b, the tubular part 12a is inserted inside the opening of the tubular part of the flanged tubular member 9 and brought into pressure contact and bonded with the inner circumferential surface thereof and with the cut pieces of the flange part 12b.

To fix the flanged tubular member 13, a flange part 13b is first brought into pressure contact and bonded with the inner circumferential surface of the manhole lining material 11 at the portion surrounding the hole 11b, and each cut piece (not illustrated) of the center part of the flange part 13b is bent and brought into pressure contact and bonded with the inner circumferential surface of the main pipe 2'. Next, from the hole 11b and the opening of the center part of the flange part 13b, the tubular part 13a is inserted inside the opening of the main pipe 2' and brought into pressure contact and bonded with the inner circumferential surface thereof and with the cut pieces of the flange part 13b.

After the flanged tubular members 12, 13 are fixed in this manner, although not illustrated, the gap between the outer circumference of the manhole lining material 11 shrunken by hardening and the inner circumference of the manhole 1 is filled with a filler, which is then hardened, thereby finishing the rehabilitation construction work.

According to the embodiment of the rehabilitation construction work as described above, flanged tubular members 5, 8, 9, 12 and 13 are capable of sealing the gap (opening) between the inner circumference of the branch pipe 3 and the outer circumference of the branch pipe lining material (rehabilitating pipe) 4 at the circumferential edge part of the opening of the branch pipe 3, sealing the gap between the inner circumference of the main pipe 2 and the outer circumference of the rehabilitating pipe 6 at the circumferential edge parts of the hole 6a and the opening of the branch pipe 3, sealing the gap between the inner circumference of the main pipe 2 and the outer circumference of the rehabilitating pipe 6 at the circumferential edge parts of the opening of the main pipe 2 and the opening of the rehabilitating pipe 6, sealing the gap between the inner circumference of the manhole 1 and the outer circumference of the manhole lining material (rehabilitating pipe) 11 at the circumferential edge parts of the hole 11a and the opening of the main pipe 2 and the opening of the rehabilitating pipe 6, and sealing the gap between the inner circumference of the manhole 1 and the outer circumference of the manhole lining material (rehabilitating pipe) 11 at the circumferential edge parts of the hole 11b and the opening of the main pipe 2'.

Because each flanged tubular member, with the tubular part and the flange part each separate and in a flexible state, is brought into pressure contact with the inner circumferential surface of the existing pipe (1, 2, 2'), the rehabilitating pipe (4, 6, 11), or the tubular part of the flanged tubular member inside the rehabilitating pipe, and then hardened by hardening the liquid setting resin, the angle of intersection of the tubular part with respect to the flange part is matched to the angle of intersection of the existing pipe and the rehabilitating pipe, and the tubular part and the flange part are thereby manufactured as hardened objects having a shape that tightly seals, without any gap, to the inner circumferential surface of the existing pipe or the rehabilitating pipe (or the tubular part of the flanged tubular member inside the rehabilitating pipe), and bonded to the abovementioned inner circumferential surfaces. Accordingly, the flanged tubular members completely plug the openings or gaps between the inner circumference of the existing pipe and the outer circumference of the rehabilitating pipe at the circumferential edge parts of the abovementioned openings (or holes and openings), thereby enabling the complete sealing of the openings and reliably preventing the leakage of filler and the infiltration of ground water.

In addition, when forming the hole 6a of the rehabilitating pipe 6 with a cutter (not illustrated), and the like, the flanged tubular member 5 can protect the flange part 4a of the branch pipe lining material 4 so that it is not damaged by the cutter and the like. Furthermore, because the rehabilitating pipe 6 comprises the transparent segments 7, it is not difficult to form the hole 6a so that the flange part 4a is not damaged; however, because mistakes are made, it is better to protect it beforehand with the flanged tubular member 5. In addition, if the rehabilitating pipe 6 is made of an opaque lining material, then it is definitely necessary to provide protection by the flanged tubular member 5. Conventionally, a metallic, cylindrical collar is attached to protect the flange part 4a, but providing the flanged tubular member 5 makes that collar unnecessary, and enables the perfect sealing of the openings or the gaps by covering the flange part 4a.

Furthermore, even if the rehabilitating pipe of the main pipe 2 is formed from a lining material, and even if the rehabilitating pipe of the manhole 1 is assembled from segments, it is understood that it is possible to apply the method of sealing the gaps with flanged tubular members, as discussed above.

In the above embodiment, cut pieces are formed that overlap the tubular part at the center part of the flange part of the flanged tubular member, but it is also acceptable to form the cut pieces overlapping the flange part at the end part of the tubular part on the flange part side, or to form the cut pieces so that they overlap with their counterpart at both the flange part and the tubular part. In addition, it is understood that the material properties of the flanged tubular member are not limited to the resin absorber impregnated with liquid setting resin. It is also understood that the structure for coupling the tubular part and the flange part is not limited to the embodiments, and that another structure can be adopted, such as integrally forming both. In addition, the method of fixing the flange part and the tubular part of the flanged tubular member to the inner circumferential surface of the existing pipe or the rehabilitating pipe (or the tubular part of the flanged tubular member inside the rehabilitating pipe) is not limited to bonding, and another method can be adopted, such as welding.

What is claimed is:

1. A method for rehabilitating an existing pipe in a sewage piping facility having a first existing pipe intersecting with a second existing pipe, comprising the steps of:
    providing a rehabilitating pipe having a flange at one end thereof;
    laying the rehabilitating pipe inside the first existing pipe so that the flange of the rehabilitating pipe contacts an inner circumferential surface portion of the second existing pipe surrounding a portion where the first and second existing pipes intersect;
    preparing a flanged tubular member having a tubular part and a flange part on one end of the tubular part;
    adhesively fixing the flange part of the flanged tubular member to the inner circumferential surface of the second existing pipe so that the flange part covers the flange of the rehabilitating pipe and the inner circumferential surface portion of the second existing pipe; and
    inserting the tubular part of the flanged tubular member into the rehabilitating pipe and adhering the tubular part to the rehabilitating pipe to thereby seal a gap between an inner circumference of the first existing pipe and an outer circumference of the rehabilitating pipe.

2. A method for rehabilitating an existing pipe in a piping facility having an existing main pipe intersecting with an existing service pipe, comprising the steps of:
   laying a rehabilitating pipe inside the existing service pipe so that the rehabilitating pipe crosses over the existing main pipe;
   forming a hole in the rehabilitating pipe at a position thereof intersecting with the existing main pipe;
   preparing a flanged tubular member having a tubular part and a flange part on one end of the tubular part;
   adhesively fixing the flange part of the flanged tubular member to an inner circumferential surface of the rehabilitating pipe; and
   inserting the tubular part of the flanged tubular member through the hole of the rehabilitating pipe and into the existing main pipe and adhering the tubular part to an inner circumferential surface of the existing main pipe to thereby seal a gap between an inner circumference of the existing service pipe and an outer circumference of the rehabilitating pipe.

3. A method of rehabilitating an existing pipe according to claim 1; wherein the flanged tubular member comprises a flexible resin absorber impregnated with a liquid setting resin; and further comprising the step of providing the flexible resin absorber in an uncured state and curing the flexible resin absorber during the step of adhesively fixing the flange part of the flanged tubular member to the inner circumferential surface of the second existing pipe and the step of adhering the tubular part of the flanged tubular member to the rehabilitating pipe.

4. A method for rehabilitating an existing pipe according to claim 3; wherein the tubular part and the flange part of the flanged tubular member are separate and independent parts in the uncured state and are integrally bonded together after the curing step.

5. A method of rehabilitating an existing pipe according to claim 2; wherein the flanged tubular member comprises a flexible resin absorber impregnated with a liquid setting resin; and further comprising the step of providing the flexible resin absorber in an uncured state and curing the flexible resin absorber during the step of adhesively fixing the flange part of the flanged tubular member to the inner circumferential surface of the second existing pipe and the step of adhering the tubular part of the flanged tubular member to the rehabilitating pipe.

6. A method for rehabilitating an existing pipe according to claim 5; wherein the tubular part and the flange part of the flanged tubular member are separate and independent parts in the uncured state and are integrally bonded together after the curing step.

7. A method for rehabilitating an existing pipe according to claim 2; wherein the existing service pipe comprises a manhole.

8. A method for rehabilitating an existing pipe in a piping facility having a first existing pipe intersecting with a second existing pipe, comprising the steps of:
   laying a rehabilitating pipe inside the first existing pipe so that an end surface of the rehabilitating pipe is generally aligned with an end surface of the first existing pipe and an inner circumferential surface portion of the second existing pipe;
   preparing a flanged tubular member having a tubular part and a flange part on one end of the tubular part;
   bonding the flange part of the flanged tubular member to the inner circumferential surface portion of the second existing pipe and to the end surfaces of the rehabilitating pipe and the first existing pipe; and
   inserting the tubular part of the flanged tubular member into the rehabilitating pipe and bonding the tubular part to an inner circumferential surface of the rehabilitating pipe to thereby seal a gap between an inner circumference of the first existing pipe and an outer circumference of the rehabilitating pipe.

9. A method for rehabilitating an existing pipe in a piping facility according to claim 8; wherein the second existing pipe comprises a service pipe of the piping facility.

10. A method for rehabilitating an existing pipe in a piping facility having at least first and second intersecting existing pipes, comprising the steps of:
    providing a first rehabilitating pipe having a tubular portion and a flange portion extending from the tubular portion;
    laying the first rehabilitating pipe inside the first existing pipe so that the flange of the first rehabilitating pipe extends into the second existing pipe;
    bonding the flange portion of the first rehabilitating pipe to an inner circumferential surface portion of the second existing pipe;
    bonding the tubular portion of the first rehabilitating pipe to an inner circumferential surface of the first existing pipe;
    providing a first flanged tubular member having a tubular part and a flange part extending from the tubular part;
    adhesively fixing the flange part of the first flanged tubular member to the inner circumferential surface of the second existing pipe so that the flange part covers the flange portion of the first rehabilitating pipe and the inner circumferential surface portion of the second existing pipe;
    inserting the tubular part of the first flanged tubular member into the first rehabilitating pipe and adhering the tubular part to the first rehabilitating pipe to thereby seal a gap between the inner circumferential surface of the first existing pipe and an outer circumferential surface of the first rehabilitating pipe;
    laying a second rehabilitating pipe inside the second existing pipe so that the second rehabilitating pipe crosses over the first existing pipe;
    forming a hole in the second rehabilitating pipe at a position thereof intersecting with the first existing pipe while the first flanged tubular member protects the first rehabilitating pipe from damage during formation of the hole;
    providing a second flanged tubular member having a tubular part and a flange part extending from the tubular part;
    bonding the flange part of the second flanged tubular member to an inner circumferential surface of the second rehabilitating pipe; and
    bonding the tubular part of the second flanged tubular member to an inner circumferential surface of the tubular part of the first flanged tubular member to thereby seal a gap between an inner circumference of the second existing pipe and an outer circumference of the second rehabilitating pipe.

11. A method for rehabilitating an existing pipe according to claim 10; wherein the step of laying the second rehabilitating pipe further comprises the step of laying the second rehabilitating pipe inside the second existing pipe so that an end surface of the second rehabilitating pipe is generally aligned with an end surface of the second existing pipe and an inner circumferential surface portion of a third existing pipe of the piping facility intersecting with the second existing pipe; and further comprising the steps of providing a third flanged tubular member having a tubular part and a flange part extending from the tubular part, bonding the flange part of the third flanged tubular member to the inner circumferential surface portion of the third existing pipe and to the end surfaces of the second rehabilitating pipe and the second existing pipe, and bonding the tubular part of the third flanged tubular member to the inner circumferential surface of the second rehabilitating pipe to thereby seal a gap between an inner circumference of the second existing pipe and an outer circumference of the second rehabilitating pipe.

12. A method for rehabilitating an existing pipe according to claim 11; further comprising the steps of laying a third rehabilitating pipe inside the third existing pipe so that the third rehabilitating pipe crosses over the second existing pipe, forming a hole in the third rehabilitating pipe at a position thereof intersecting with the second existing pipe, providing a fourth flanged tubular member having a tubular part and a flange part extending from the tubular part, adhesively fixing the flange part of the fourth flanged tubular member to an inner circumferential surface of the third rehabilitating pipe, and adhering the tubular part of the fourth flanged tubular member to an inner circumferential surface of the tubular part of the third flanged tubular member to thereby seal a gap between the inner circumference of the second existing pipe and an outer circumference of the third rehabilitating pipe.

13. A method for rehabilitating an existing pipe according to claim 12; wherein the first, second and third existing pipes comprise a branch pipe, a main pipe, and a service pipe, respectively, of the piping facility.

14. A method of rehabilitating an existing pipe according to claim 12; wherein each of the first, second, third and fourth flanged tubular members comprises a flexible resin absorber impregnated with a liquid setting resin; and wherein each of the steps of providing the first, second, third and fourth flanged tubular members further comprises the steps of providing the flexible resin absorber in an uncured state and curing the flexible resin absorber during the corresponding adhering and bonding steps.

15. A method for rehabilitating an existing pipe according to claim 14; wherein the tubular part and the flange part of each of the first, second, third and fourth flanged tubular members are separate and independent parts in the uncured state and are integrally bonded together after the curing step.

* * * * *